Sept. 21, 1943.   W. A. BEDFORD, JR   2,329,688
SNAP FASTENER AND TRIM STRIP AND THE LIKE
Filed Feb. 14, 1942
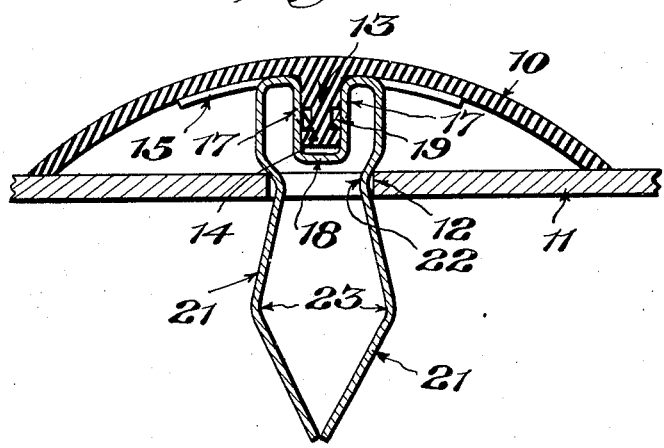
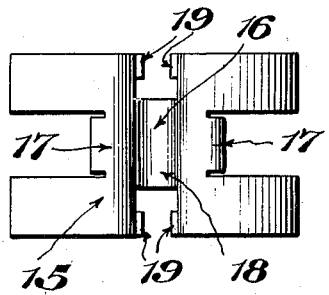
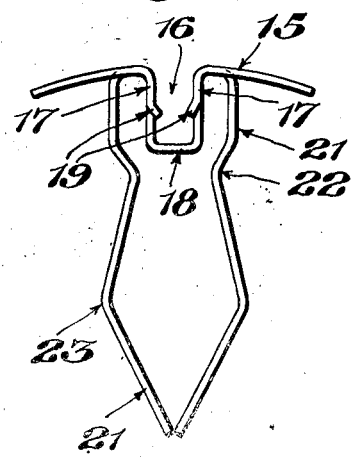
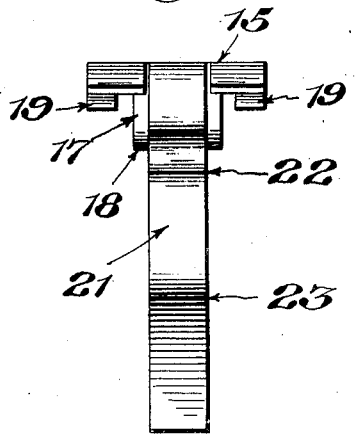
Inventor
William A. Bedford, Jr.,
By John Todd
Attorney Patented Sept. 21, 1943

2,329,688

UNITED STATES PATENT OFFICE 2,329,688

SNAP FASTENER AND TRIM STRIP AND THE LIKE

William A. Bedford, Jr., Hingham, Mass., assignor to United-Carr Fastener Corporation, Cambridge, Mass., a corporation of Massachusetts Application February 14, 1942, Serial No. 430,927

5 Claims. (Cl. 189—88)

The present invention relates to improvements in snap fasteners for attaching trim strips to a supporting panel and aims generally to improve existing fasteners for that purpose.

The present invention aims to improve snap fasteners for a similar purpose of the type shown in the copending application of Howard J. Murphy, Serial No. 422,253, filed December 9, 1941, wherein a relatively rigid rib-receiving channel fits over the rib of the trim, and resilient fingers on the fastener bite into the surface of the trim rib to retain the fastener in attached relation to the trim. In such prior constructions most of the resiliency of the fastener attaching means resides in the spring fingers which bite into the surface of the rib.

My improved fastener provides relatively rigid fingers adapted to lock in grooves in the trim rib and they are so disposed as to resist separation of the fastener from the rib. Necessary resiliency in my fastener is provided solely by the rib-receiving channel.

One preferred embodiment of the invention, which is intended merely as illustrative thereof, is shown in the accompanying drawing, wherein Fig. 1 is an enlarged transverse sectional view of an assembled installation of trim strips and apertured supporting part illustrating the use of my improved fastener;

Fig. 2 is an enlarged edge elevation of my improved snap fastener;

Fig. 3 is an enlarged side elevation thereof; and

Fig. 4 is an enlarged plan view thereof.

Referring to the drawing, it will be apparent that my improved snap fastener is particularly adaptable for securing a beaded trim or like strip 10 to a supporting panel 11 formed with an aperture 12. The trim strip 10 may be of any desirable shape and construction, herein illustrated as arcuate, and has a bead or rib 13 extending from one face thereof, for example from the inner concaved face. The bead or rib may extend lengthwise of the strip, and is preferably formed with longitudinal grooves 14 on opposite sides of the rib for interlocking cooperation with the snap fastener as will be described later.

My improved snap fastener is provided with a head portion supporting a substantial region of the trim strip or other article and having means for snap locking engagement with the rib or bead of the article. The fastener also has a shank portion for snap fastening engagement with the apertured support or panel.

As illustrated in the preferred embodiment, my improved snap fastener is formed from a single blank of metal and has a head portion 15, preferably bowed longitudinally or otherwise shaped to conform to the interior of the article 10. The head 15 is generally of H-shape in plan (see Fig. 4).

The central portion of the head 15, across the bridge of the H, is bent to form a resilient U-shaped rib-receiving clip or channel 16, thus dividing the head into two resilient portions 17 connected by a bottom 18 and each resiliently engaging one side of the rib and an adjoining region of an adjacent face of the article.

Preferably the head 15 is of greater length (lengthwise of the channel) than the resilient portions 17, and the terminal ends of the head forming the sides of said channel are formed with integral locking tongues 19 disposed substantially in the planes of the portions 17, and being substantially rigid in the direction of the depth of the channel so as effectively to resist withdrawal of the rib from the channel. Preferably the lower ends of the tongues 19 are inturned towards each other, and are adapted to be positioned in the longitudinal grooves 14 in the sides of the rib. This construction permits the tongues to effectively resist movement of the rib 13 out of the channel 16 even though they loosely engage the rib 13 and thus the secure installation is not dependent upon a biting of the tongues into the rib 13 as hertofore.

The fastener also includes an attaching shank portion comprising a pair of legs 21 joined to the head along lines 22 inwardly of the side edges thereof and spaced from the portions 17. The legs then extend downwardly to a plane slightly below the channel bottom 18 and are formed with inwardly extending shoulder portions 22 for engagement with the apertured support. The legs thereafter are bowed outwardly to provide a resilient bowed head 23 below the shoulder or neck portions 22.

The fastener may be readily attached to a molding strip of the type described by positioning the channel 16 over the rib. This is readily accomplished by reason of the resiliently connected channel sides and when applied, the tongues 19 lie flat against the sides of the rib with the inturned ends thereof positioned in the channels or grooves 14 of the rib. The combined molding strip and fastener may be attached to the apertured support by merely forcing the shank portions of the fastener through the support aperture past the bowed head 22, permitting the shoulder or neck portion to snap into engagement with the edges of the support aperture.

My improved fastener members are relatively simple in construction, quite easy to manufacture and are particularly efficient, especially due to the construction of the base and its associated portions which provide a secure means by which the fasteners are attached to the rib or other similar aligning means which cooperates with the folded portion or other similar aligning means of the fastener.

While I have illustrated and described a preferred embodiment of my invention, I do not wish to be limited thereby because the scope of my invention is best defined in the accompanying claims.

I claim:

1. In combination with an apertured support and a part to be attached thereto formed with an angularly disposed rib, a fastener member securing said part to said support, said fastener member comprising a shank including two spaced legs engaged with the support through the aperture thereof, and a head integrally connected and joining said legs, said head comprising a body portion formed with a central fold providing a U-shaped channel receiving said rib and dividing the head into two resiliently connected portions, the sides of the U-shaped channel serving to resiliently connect said two head portions together, and locking tongues integrally connected to the sides of said U-shaped channel, said tongues engaging said rib and rigidly resisting withdrawal of said rib from said channel.

2. In combination with an apertured support and a part to be attached thereto formed with an angularly disposed rib having longitudinal grooves in the side faces thereof, of a fastener member securing said part to said support, said fastener member comprising a shank including two spaced legs engaged with the support through the aperture thereof, and a head integrally connected and joining said legs, said head comprising a body portion formed with a central fold providing a U-shaped channel receiving said rib and dividing the head into two resiliently connected portions, the sides and bottom of the U-shaped channel being of less length than the head and serving to resiliently connect said two head portions together, and locking tongues integrally connected to the resiliently connected head portions and disposed substantially in the planes of the sides of said U-shaped channel, said tongues engaging said rib and rigidly resisting withdrawal of said rib from said channel.

3. In combination with an apertured support and a part to be attached thereto formed with an angularly disposed rib having longitudinal grooves in the side faces thereof, of a fastener member securing said part to said support, said fastener member comprising a shank including two spaced legs engaged with the support through the aperture thereof, and a head integrally connected and joining said legs, said head comprising a body portion formed with a central fold providing a U-shaped channel receiving said rib and dividing the head into two resiliently connected portions, the sides of the U-shaped channel being of less length than the head and serving to resiliently connect said two head portions together, and locking tongues integrally connected to the adjacent edges of the resiliently connected head portions and disposed substantially in the planes of the sides of said U-shaped channel, said tongues having inwardly directed terminal ends positioned in the grooves of said rib and rigidly resisting withdrawal of the rib from the channel.

4. In combination with an apertured support, and a part to be attached thereto formed with an angularly disposed rib having longitudinal grooves in the side faces thereof, of a fastener member securing said part to said support, said fastener member comprising a shank including two spaced legs engaged with the support through the aperture thereof, and a head integrally connected and joining said legs, said head comprising a body portion formed with a central fold providing a U-shaped channel receiving said rib and dividing the head into two resiliently connected portions, the sides of the U-shaped channel being of less length than the head and serving to resiliently connect said two head portions together, and locking tongues integrally connected to the adjacent edges of the resiliently connected head portions and disposed substantially in the planes of the sides of said U-shaped channel, said tongues having inwardly directed terminal ends positioned in and loosely engaging the sides of the grooves of said rib and rigidly resisting withdrawal of the rib from the channel.

5. In combination with an apertured support, and a part to be attached thereto formed with an angularly disposed rib having longitudinal grooves in the side faces thereof, of a fastener member securing said part to said support, said fastener member comprising a shank including two spaced legs engaged with the support through the aperture thereof, and a head integrally connected and joining said legs, said head comprising a body portion formed with a central fold providing a U-shaped channel receiving said rib and dividing the head into two resiliently connected portions, the sides and bottom of the U-shaped channel being of less length than the head and serving to resiliently connect said two head portions together, and locking tongues integrally connected to the adjacent edges of the resiliently connected head portions and disposed substantially in the planes of the sides of said U-shaped channel, said tongues having inwardly directed terminal ends positioned in and loosely engaging the sides of the grooves of said rib and rigidly resisting withdrawal of the rib from the channel.

WILLIAM A. BEDFORD, Jr.